(12) United States Patent
Melendez et al.

(10) Patent No.: US 7,449,205 B2
(45) Date of Patent: Nov. 11, 2008

(54) BANANA COATING FOR ENHANCED QUALITY ON STORAGE AND SHIPPING

(75) Inventors: Eduardo Melendez, Antwerp (BE); Mats Stading, Göteborg (SE); Anders Pettersson, Göteborg (SE)

(73) Assignee: Chiquita Brands, Inc., Cincinnati, OH (US)

( * ) Notice: Subject to any disclaimer, the term of this patent is extended or adjusted under 35 U.S.C. 154(b) by 618 days.

(21) Appl. No.: 10/980,529

(22) Filed: Nov. 3, 2004

(65) Prior Publication Data

US 2005/0112250 A1    May 26, 2005

Related U.S. Application Data

(60) Provisional application No. 60/517,526, filed on Nov. 5, 2003.

(51) Int. Cl.
*A23L 1/05* (2006.01)
*A23L 1/212* (2006.01)
*A23L 3/00* (2006.01)

(52) U.S. Cl. .......................... 426/98; 426/615; 426/99; 426/102; 426/103; 426/601; 426/602

(58) Field of Classification Search ................. 426/615, 426/98, 99, 102, 103, 601, 602
See application file for complete search history.

(56) References Cited

U.S. PATENT DOCUMENTS 2,909,435 A * 10/1959 Watters et al. ............... 426/102
6,299,915 B1 * 10/2001 Nussinovitch et al. ........ 426/89

FOREIGN PATENT DOCUMENTS

WO            97/23138       *   7/1997

OTHER PUBLICATIONS

Xanthan Gums, Food Resource, Oregon State University, http://food.oregonstate.edu/gums/xanthan.html, site visited Jan. 10, 2005.
Food Emulsifiers (Grindsted® Acetem), Gillco Ingredients, http://www.gillco.com/pages/food.html, site visited Jan. 10, 2005.
Danisco Emulsifiers for food—Product Range (Grindsted® Acetem), Danisco, http://www.danisco.com/emulsifiers/productrange/food.asp, site visited Jan. 10, 2005.

* cited by examiner

*Primary Examiner*—Helen F Pratt
(74) *Attorney, Agent, or Firm*—Frost Brown Todd LLC

(57) ABSTRACT

Coatings for fruit, particularly respiring fruit, such as bananas or melons, are disclosed. The coatings comprise food grade materials selected from polysaccharides, proteins, lipids, waxes, and mixtures of those materials. Preferred coating include xanthan and/or acylated glycerides.

11 Claims, No Drawings

BANANA COATING FOR ENHANCED QUALITY ON STORAGE AND SHIPPING

CROSS REFERENCE TO RELATED APPLICATION

This application is based upon and claims priority from U.S. Provisional Application No. 60.517,526, filed Nov. 5, 2003, incorporated herein by reference.

TECHNICAL FIELD

The present invention relates to coatings for produce, particularly respiring produce, such as melons or bananas, and most particularly for bananas. These coatings act to preserve the quality of the fruit during storage and/or shipping.

BACKGROUND OF THE INVENTION

Fruit, and particularly bananas, are shipped from tropical locations where they are grown, such as Central America, to markets overseas where they are consumed. Handling of the fruit during packing, transportation and unloading may bruise the bananas and thereby decrease the quality of the fruit to the consumer. The evaporation of water from the fruit after harvest also leads to decreased quality, and thus to a lower market price. The present invention, therefore, relates to coatings which are placed on bananas and other fruit in order to make the fruit less sensitive to the harsh handling conditions of storage and shipping. The coatings of the present invention provide reduced friction between banana hands and individual bananas thereby decreasing bruising of the fruit, retain permeability to ethylene thereby allowing the fruit to continue the ripening process, and consist of food grade material. The coatings also preferably decrease water loss of the fruit, are easy to apply at field conditions, and are able to stand hot and humid conditions.

SUMMARY OF THE INVENTION

The coatings of the present invention are described below.

Specifically, the present invention relates to a method for preparing produce for storage and/or shipping comprising coating said produce with a food grade material selected from polysaccharides, protein, lipids, waxes and mixtures thereof. Xanthan and/or acylated glycerides are preferred coatings.

The present invention also relates to fruit, particularly bananas, coated as described above.

Finally, the present invention relates to an emulsion comprising wax in a polysaccharide solution or a dispersion of wax particles in a polysaccharide solution, used in the process of the present invention.

DETAILED DESCRIPTION OF THE INVENTION

Food grade materials selected from polysaccharides, proteins, lipids and waxes, as well as mixtures of those materials, may be used in the present invention. These materials are well known in the food arts. Polysaccharides form excellent, transparent, strong films, and are relatively inexpensive, especially starch which is abundant in large quantities. They are generally gas tight, water vapor permeable and water sensitive. Proteins have similar film-forming properties as polysaccharides, but are more hydrophobic which makes them less sensitive to water and slightly less gas tight. Examples of useful proteins include gelatin and milk protein. Waxes form coatings which have less preferred mechanical properties, but are very good water and water vapor barriers. Mixtures of those materials may also be used; such mixtures tend to optimize the properties of the coating. Examples of polysaccharides which may be used in the present invention include starch, pectin and xanthan. Xanthan is a bacterial polysaccharide and is thus relatively inexpensive. It is used at low concentrations (less than 1%) in foods, mainly as a stabilizer or thickener. Its original function was to provide moist conditions for its bacteria. Therefore, the xanthan should help to keep the fruit moist upon coating. An example of a useful material is GRINDSTED® Xanthan 80, an easy dispersing, free-flowing powder xanthan gum, commercially available from Danisco Emulsifiers, Denmark. Another example of a useful polysaccharide is Gellan gum, a bacterial exopolysaccharide having a relatively high molecular weight.

Lipids and waxes are interesting for coating applications since they occur naturally on fruits and provide a low friction surface. Examples of waxes which may be used include beeswax, carnauba wax, and acetylated glycerides (i.e., mono-, di-, and triglycerides), as well as mixtures of those materials. An example of an acetylated glyceride useful in the present invention is sold under the trade name ACETEM™. This material is plant derived and is approved for food use. It is a paste at room conditions and melts into a fluid at elevated temperatures. An example of such a material is GRINDSTED™ ACETEM 70-008, an acetic acid ester of monoglycerides made from edible, fully hydrogenated palm-based oil, commercially available from Danisco Emulsifiers, Denmark.

The coating material may be applied to the fruit using any known coating technology, such as spraying (e.g., aerosol spraying) or dipping. The coating technique should be one which is easily integrated into the fruit processing stream. Spraying is preferred since banana hands are already sprayed in-line during their typical processing. The amount sprayed on the banana hands can vary, but typically is in the range of from about 1 to about 3 grams per hand using a solution of from about 1% to about 10%, preferably about 4%, coating material. Any edible, food-grade solvent may be used; water is the preferred solvent. The coating materials may be applied onto the fruit either as single materials or as mixtures of materials. The coatings may be applied in layers. The properties of the specific materials to be applied will help determine the particular technique used to apply them. In general, the coatings are applied onto the fruit at a thickness of from about 1 to about 100 μm, more preferably from about 5 to about 50 μm.

Preferred materials for use in forming the coatings of the present invention are xanthan and acetylated glycerides. A particularly preferred coating is a mixture of xanthan with acetylated glyceride (such as ACETEM™), having a xanthan/acetylated glyceride ratio of from about 0.05 to about 0.25, preferably about 0.14(w/w). Acetylated glycerides tend to be hydrophobic and therefore are not soluble in water. As a result, a mixture of acetylated glyceride and a solution of xanthan separates into two phases. This tends to produce a coating which consists of islands of individual ingredients on the fruit. These mixed coatings can be made using two different processes:

(a) Emulsion coating—a warm mixture of acetylated glyceride in a xanthan solution is homogenized into an emulsion consisting of acetylated glyceride droplets in a continuous xanthan solution phase. The warm emulsion can then be sprayed onto the banana hands using conventional spray techniques.

(b) Dispersion coating—a warm mixture of acetylated glyceride in a xanthan solution is homogenized into an emulsion of acetylated glyceride droplets in a continuous xanthan solution phase. The solution is then cooled to 23° C. under continuous stirring such that the acetylated glyceride crystallizes into small particles. This dispersion can then be sprayed onto the banana hands.

Use of the coatings on fruit, particularly bananas, provides several benefits both to the grower/producer and to the consumer. When the coatings are placed on the fruit, the friction of the banana skin is lowered significantly. The amount of such reduction depends, among other things, on the nature of the particular coating used and the thickness of the coating. This reduced skin friction results in reduced bruising of the fruit. The ripening process of the fruit requires that the coating placed on the fruit be ethylene permeable. The coatings of the present invention are sufficiently ethylene permeable to permit normal ripening. Care must be taken, however, to make certain that the coatings are not applied too thickly since that may lower permeability to a point where the ripening process is compromised. The coatings of the present invention can also be manipulated in order to reduce moisture loss in the fruit. For example, a small amount of beeswax can be added to the coating in order to reduce moisture loss without preventing the ripening of the bananas. The coatings of the present invention become invisible when dried, thereby making them more acceptable to the consumers. In fact, it is difficult to visually detect any difference between coated and uncoated bananas even with close inspection.

Additional beneficial ingredients known in the art may be added to the coatings when they are sprayed onto the fruit in order to provide additional benefits. For example, an anti-mold agent can be added to the coating and sprayed onto the fruit in order to minimize the formation of mold on the fruit during storage.

EXAMPLES

The following materials, techniques and methods are used to coat bananas according to the present invention. All material percentages are given as weight percent.

Coating Materials

ACETEM 70-00 (acetic acid ester of monoglycerides), Danisco Emulsifiers, Brabrand, Denmark.

Xanthan, Sanofi Bio-industries, Paris, France

Potato starch, Lyckeby Stakelsen, Kristianstad, Sweden

Pectin, Daniso Emulsifiers, Brabrand, Denmark

Beeswax

Coating Techniques

Spraying Technique—A hand-held spray gun with adjustable air/solution mixture is used with a nozzle size of 1.0 mm diameter. The feed air pressure is 4.5 bar and the temperature of the solutions are 23° C. or 80° C. depending on solution. All samples are coated at ambient temperature. A sweeping motion of the spray gun ~40 cm from the sample results in a smooth coating. For pure ACETEM and beeswax coatings the melted materials are sprayed with the spray gun. Due to the pressure drop, the temperature decreases too rapidly and the small droplets sometimes crystallize before reaching the sample. To be able to get a smooth coating, the samples are postheated with a heat gun.

Emulsion Coating—A mixture of xanthan (0.5%), water (95.9%) and ACETEM (3.6%) or beeswax (3.6%) is heated to ~90° C. in a water bath. Emulsification of the solution is achieved by mixing with a magnetic stirrer at maximum speed. The emulsified hot solution is then transferred to the spray gun and sprayed on the sample.

Dispersion Coating—A mixture of xanthan (0.5%), water (95.9%) and ACETEM (3.6%) or beeswax (3.6%) is mixed and emulsified as the emulsion coating solution. The hot emulsion is allowed to cool down to room temperature (~25° C.) in a water bath (15° C.) during continued stirring, thus forming small dispersed particles of ACETEM or beeswax. The dispersion is then transferred to the spray gun and sprayed onto the sample. To avoid clogging the nozzle, a rich mixture is used.

Dipping—Some bananas are dipped in the solutions described above. Dipping the sample in solution for a few seconds is generally enough to cover the sample completely. The produced coating is similar to a sprayed one though the viscosity should be adjusted to get the optimal thickness.

What is claimed is:

1. A method of preparing whole bananas for storage and/or shipping comprising coating said bananas with a coating comprising a mixture of xanthan and acetylated glyceride.

2. The method according to claim 1 wherein the bananas are coated by spraying.

3. The method according to claim 1 wherein the bananas are coated by dipping.

4. The method according to claim 1 wherein the xanthanl/acetylated glyceride ratio is about 0.14 (w/w).

5. The method according to claim 4 wherein the mixture is applied by spraying at a spraying concentration of about 4% (w/w).

6. The method according to claim 1 wherein the coating has a thickness of from about 1 to about 100 μm.

7. The method according to claim 6 wherein the coating has a thickness of from about 5 to about 50 μm.

8. The method according to claim 1 wherein the coating is sprayed onto the produce as an emulsion of acetylated glyceride in a continuous xanthan solution.

9. The method according to claim 1 wherein the coating is sprayed onto the produce as a dispersion of acetylated glyceride particles in a xanthan solution.

10. Coated bananas prepared according to the method of claim 1.

11. Coated bananas prepared according to the method of claim 4.

* * * * *